(12) United States Patent
Koike

(10) Patent No.: US 7,463,571 B2
(45) Date of Patent: Dec. 9, 2008

(54) OPTICAL ELEMENT, OPTICAL PICKUP, AND OPTICAL INFORMATION RECORDING/REPRODUCING APPARATUS

(75) Inventor: Katsuhiro Koike, Saitama (JP)

(73) Assignee: Pioneer Corporation, Tokyo (JP)

( * ) Notice: Subject to any disclaimer, the term of this patent is extended or adjusted under 35 U.S.C. 154(b) by 148 days.

(21) Appl. No.: 10/593,395

(22) PCT Filed: Mar. 15, 2005

(86) PCT No.: PCT/JP2005/004508

§ 371 (c)(1),
(2), (4) Date: Feb. 23, 2007

(87) PCT Pub. No.: WO2005/091280

PCT Pub. Date: Sep. 29, 2005

(65) Prior Publication Data

US 2007/0211599 A1 Sep. 13, 2007

(30) Foreign Application Priority Data

Mar. 19, 2004 (JP) ............................... 2004-080042

(51) Int. Cl.
*G11B 7/00* (2006.01)
(52) U.S. Cl. .................................. 369/112.26; 369/121
(58) Field of Classification Search ............. 369/112.26
See application file for complete search history.

(56) References Cited

U.S. PATENT DOCUMENTS

| 6,678,096 B2 * | 1/2004 | Sugi et al. .................... 359/719 |
| 2003/0076769 A1 * | 4/2003 | Kim et al. .............. 369/112.26 |
| 2004/0160884 A1 * | 8/2004 | Kimura ................. 369/112.09 |

FOREIGN PATENT DOCUMENTS

| JP | 2001-235676 | 8/2001 |
| JP | 2003-67972 | 3/2003 |
| JP | 2003-288733 | 10/2003 |
| JP | 2004-281034 | 10/2004 |
| JP | 2005-071462 | 3/2005 |

* cited by examiner

*Primary Examiner*—Paul Huber
(74) *Attorney, Agent, or Firm*—Nixon & Vanderhye P.C.

(57) ABSTRACT

The hologram (20) for spherical aberration correction is formed in optical element (10). With respect to the first laser light which requires the largest effective diameter, the hologram does not have effect on wavefront. With respect to the second laser light which requires the second largest effective diameter, the spherical aberration is corrected by the holograms (21, 22) which are formed in a concentric and zonal pattern and construct the hologram, and the effective diameter is converged. With respect to the third laser light which requires the smallest effective diameter, only the hologram (22) has the effect of the correction for the spherical aberration. The hologram (22) is formed such that its diameter is associated with the effective diameter required by the third laser light, and the effective diameter is converged due to the combination with the incidence of the diffused laser light

11 Claims, 4 Drawing Sheets

[FIG. 1]
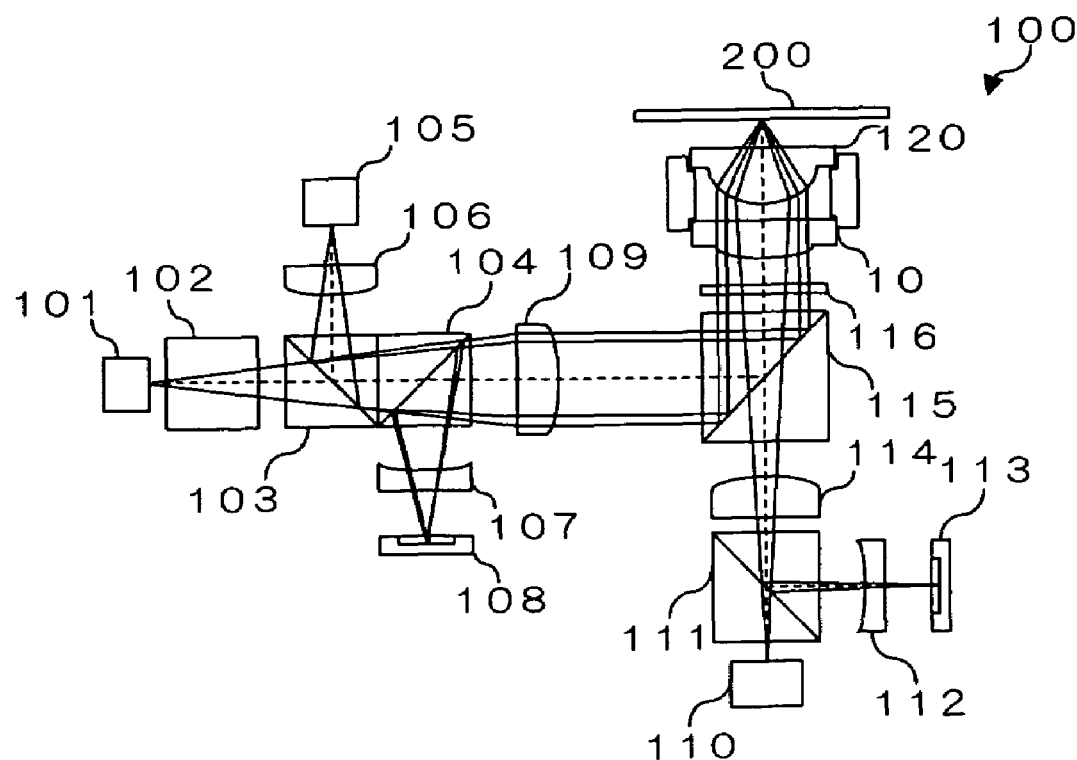
[FIG. 2]
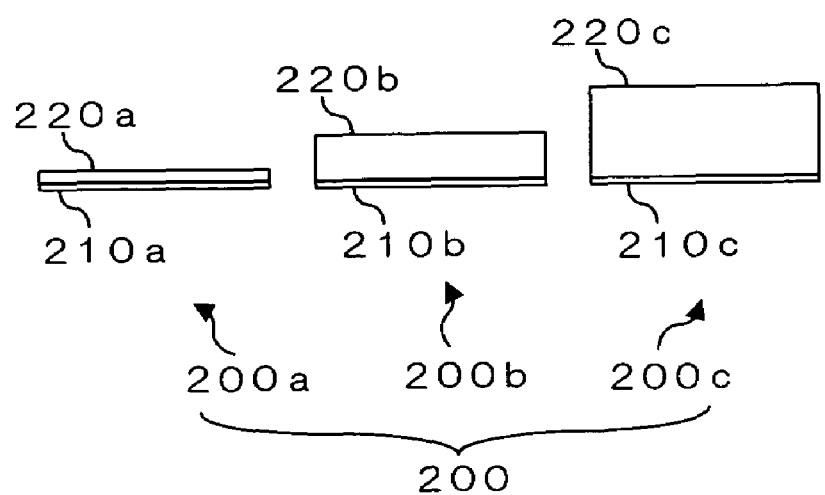

[FIG. 3]
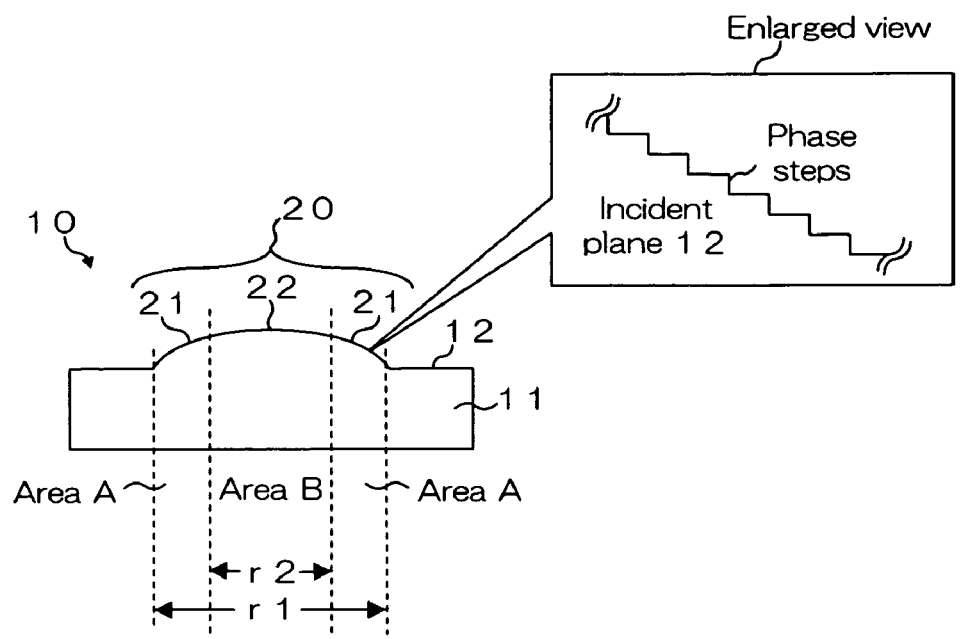
[FIG. 4]
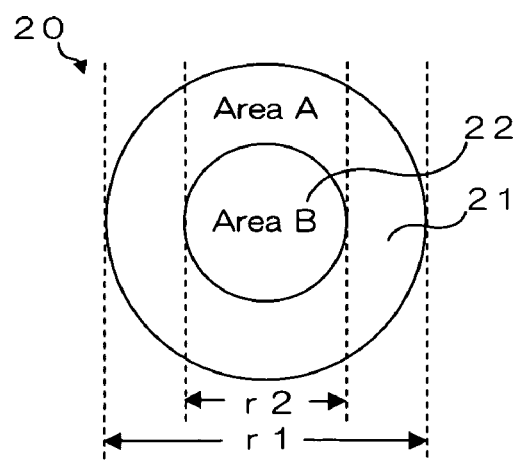

[FIG. 5]
(a)
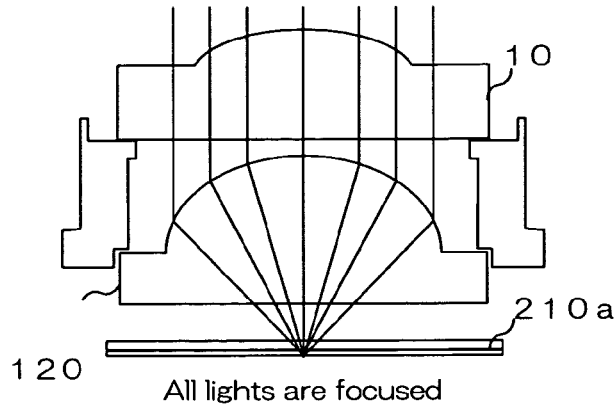
All lights are focused
(b)
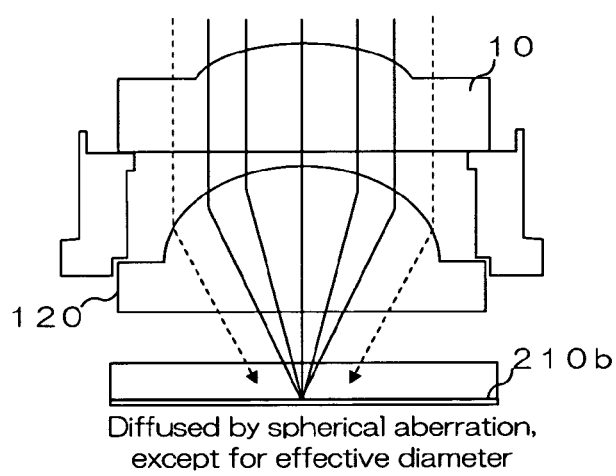
Diffused by spherical aberration, except for effective diameter
(c)
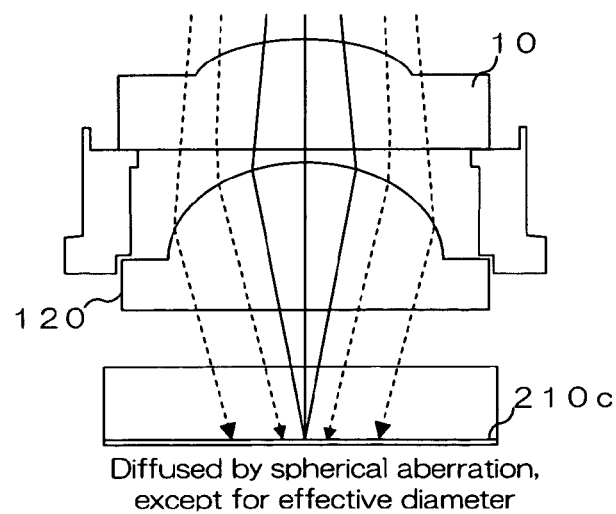
Diffused by spherical aberration, except for effective diameter

[FIG. 6]
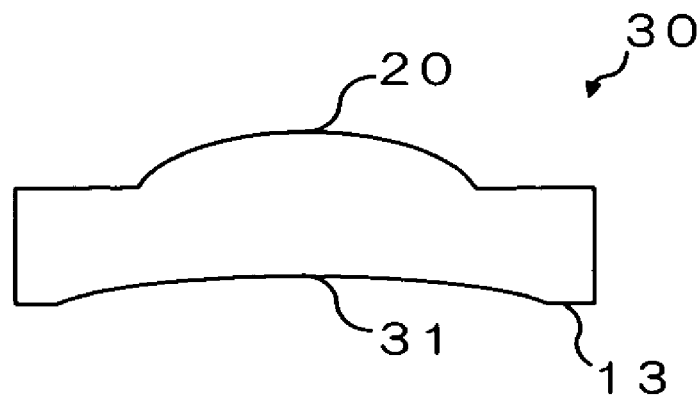
[FIG. 7]
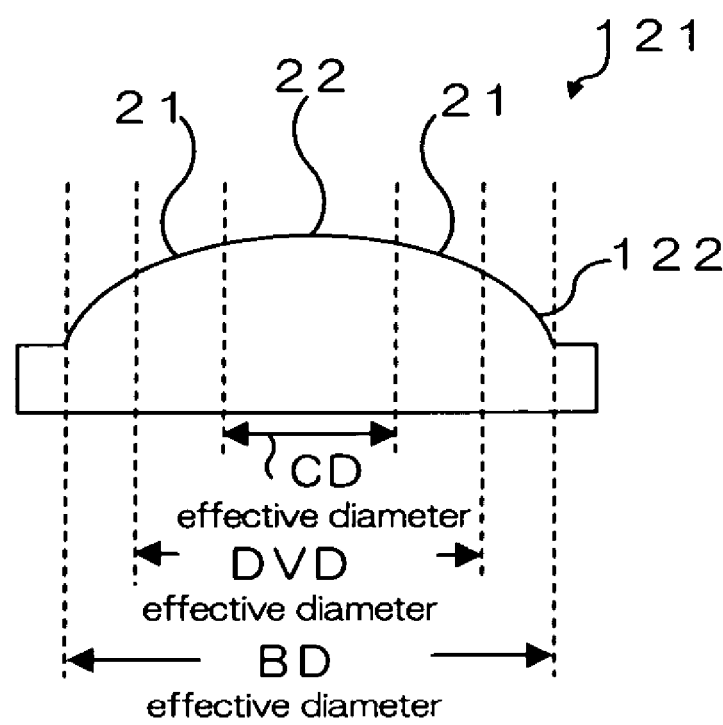

OPTICAL ELEMENT, OPTICAL PICKUP, AND OPTICAL INFORMATION RECORDING/REPRODUCING APPARATUS

This application is a 371 of PCT/JP05/04508, filed Mar. 15, 2005.

TECHNICAL FIELD

The present invention relates to an optical element, an optical pickup, and an optical information recording/reproducing apparatus, in which an objective lens can be shared among a plurality of types of recording media on which writing and reading are performed by using laser light, for example.

BACKGROUND ART

Such an optical element is disposed on the optical path of the laser light, which corresponds to each of the plurality of types of recording media, in order to share the objective lens, the optical pickup or the like among the plurality of types of recording media which have mutually different optical characteristics, such as a distance between a substrate surface and a recording layer, and a recording density. As one example of the optical element, there is proposed an optical element which realizes compatibility of the objective lens among the plurality of types of recording media by using diffraction (e.g. refer to a patent document 1).

In the optical pickup, diffraction orbicular zones are provided, and a luminous flux is flared on the outer side of a predetermined numerical aperture in a use condition on the side that the numerical aperture is smaller. Therefore, it is considered that a beam diameter is not narrowed down too much, and that the recording of the information and the reproducing of the information can be performed with respect to the plurality of types of recording media which mutually differ in thickness.

Patent document 1: Japanese Patent Application Laying Open NO. 2001-235676

DISCLOSURE OF INVENTION

Subject to be Solved by the Invention

However, the conventional optical element has a problem exemplified below.

Namely, the number of types of recording media increases, and moreover, there is a remarkable requirement for the miniaturization of the optical pickup including the optical element or the like. In this situation, in the conventional optical element, since the diffraction orbicular zones do not have an effective structure with respect to three or more types of recording media, it is impossible in practice to maintain good recording characteristics with respect to the three or more types of recording media.

In order to solve the above-mentioned conventional problem, it is therefore an object of the present invention to provide an optical element, an optical pickup, and an optical information recording/reproducing apparatus, in which an objective lens can be shared among three or more types of recording media.

Means for Solving the Object

<Optical Element>

The above object of the present invention can be achieved by an optical element disposed on an optical path of first laser light and a plurality of laser lights, in order to share an objective lens for focusing light on a first recording medium, which comprises a recording layer, which receives the first laser light through a transmission protection layer with a thickness of D1, in the plurality of laser lights whose wavelengths are different from that of the first laser light and in a plurality of recording media corresponding to the respective plurality of laser lights, the plurality of laser lights including second laser light which corresponds to a second recording medium having a transmission protection layer with a thickness of D2 (D2>D1), and third laser light which corresponds to a third recording medium having a transmission protection layer with a thickness of D3 (D3>D2) and is used in a finite system, an effective diameter of a luminous flux required when the first laser light enters the objective lens being R1, an effective diameter of a luminous flux required when the second laser light enters the objective lens being R2 (R1>R2), an effective diameter of a luminous flux required when the third laser light enters the objective lens being R3 (R2>R3), the optical element provided with: a first aberration correcting device for correcting aberration caused by a difference between the thickness D1 of the transmission protection layer and the thickness D2 of the transmission protection layer and a difference in wavelength between the first laser light and the second laser light, the first aberration correcting device being disposed in an area corresponding to the effective diameter R2 of an incidence plane or an emit plane of the optical element; and a second aberration correcting device for correcting aberration caused by the difference between the thickness D1 of the transmission protection layer and the thickness D2 of the transmission protection layer, a difference between the thickness D1 of the transmission protection layer and the thickness D3 of the transmission protection layer, the difference in wavelength between the first laser light and the second laser light and a difference in wavelength between the first laser light and the third laser light, the second aberration correcting device being disposed in an area corresponding to the effective diameter R3 of the incidence plane or the emit plane.

According to the optical element of the present invention, by the first aberration correcting device, the aberration caused by the difference between the thickness D1 of the transmission protection layer and the thickness D2 of the transmission protection layer and the difference in wavelength between the first laser light and the second laser light are corrected. On the other hand, by the second aberration correcting device, the aberration caused by the difference between the thickness D1 of the transmission protection layer and the thickness D2 of the transmission protection layer, the difference between the thickness D1 of the transmission protection layer and the thickness D3 of the transmission protection layer, the difference in wavelength between the first laser light and the second laser light and the difference in wavelength between the first laser light and the third laser light are corrected. Namely, spherical aberration or wavefront aberration related to the second laser light and spherical aberration or wavefront aberration related to the third laser light are corrected by the optical element. Therefore, it is possible to focus the second laser light on the recording layers of the second recording medium and to focus the third laser light on the third recording medium, via the objective lens, in such a condition that the spherical aberration or the wavefront aberration is reduced. In this case, it is possible to share the objective lens among at least three types of recording media including the first recording medium.

In another aspect of the optical element of the present invention, the first aberration correcting device and the second aberration correcting device are formed in different areas of the incidence plane or the emit plane, and formed in a concentric and zonal pattern.

According to this aspect, since the first aberration correcting device and the second aberration correcting device are formed as the concentric and zonal different areas on the incidence plane or the emit plane, it is possible to efficiently provide the correction effect with respect to each laser light.

In another aspect of the optical element of the present invention, the first aberration correcting device is formed in a zonal pattern with an outer diameter associated with the R2 and an inner diameter associated with the R3, on the incidence plane or the emit plane, and the second aberration correcting device is formed in a circular pattern with a diameter associated with the R3, on the incidence plane or the emit plane.

According to this aspect, the first aberration correcting device and the second aberration correcting device are formed in association with the effective diameter required for each of the laser lights. Thus, it is possible to efficiently correct the aberration by each of the correcting device.

In another aspect of the first embodiment of the optical element, wavelength range of the first laser light is 400 to 410 nm, wavelength range of the second laser light is 635 to 670 nm and wavelength range of the third laser light is 780 to 810 nm.

According to this aspect, the wavelengths of the first, second and third laser lights correspond to the wavelengths for information recording/reproduction of a BD (Blu-Ray Disc), a DVD, and a CD (Compact Disc), respectively. Thus, it is possible to share the objective lens among these recording media.

In another aspect of the optical element of the present invention, each of the first and second aberration correcting devices is a diffraction pattern in which a plurality of phase steps are formed in association with wavelength of each of the first laser light, the second laser light and the third laser light.

The "diffraction pattern" described herein is a concept which indicates something which can diffract incident light at a desired diffraction angle or diffraction order, such as concavo-convex or light and dark cross stripes, diffraction grating. For example, it is defined as pattern in which the plurality of "phase steps" formed. The phase steps are not limited to physical steps, and the phase steps may include everything which can cause some optical path length difference with respect to the various laser lights transmitted through the diffraction pattern. The phase steps may be obtained by combining areas with different refractive indexes, for example.

According to this aspect, since the first and second aberration correcting devices are formed as the diffraction pattern associated with the wavelength of each of the first, second and third laser light, it is possible to easily construct these devices.

In one aspect of the optical element in which the aberration correcting device is the diffraction pattern, the first aberration correcting device is formed to maximize diffraction efficiency of even-order (except for a multiple of 10) diffracted light of the first laser light, and the second aberration correcting device is formed to maximize diffraction efficiency of odd-order (except for a multiple of 5) diffracted light of the first laser light.

According to this aspect, it is possible to easily realize the effect related to the first aberration correcting device and the second aberration correcting device.

Moreover, in this aspect, the even-order diffracted light may be second-order diffracted light, and the odd-order diffracted light may be first-order diffracted light.

If the first aberration correcting device and the second aberration correcting device are formed in this manner, it is possible to efficiently correct the aberration targeted by each of the aberration correcting devices.

In another aspect of the optical element of the present invention, the optical element is with the objective lens as one body.

According to this aspect, the optical element is disposed with the objective lens as one body, so that it is possible to reduce the number of parts, and it is possible to reduce costs.

<Optical Pickup>

The above object of the present invention can be also achieved by an optical pickup provided with the above-mentioned optical element of the present invention (including its various aspects).

According to the optical pickup, it is possible to use three ore more recording media.

<Optical Information Recording/Reproducing Apparatus>

The above object of the present invention can be also achieved by an optical information recording/reproducing apparatus provided with the above-mentioned optical pickup of the present invention.

According to the optical information recording/reproducing apparatus, it is possible to use three ore more recording media.

As explained above, according to the optical element of the present invention, it is provided with: the first aberration correcting device; and the second aberration correcting device. Thus, it is possible to share the objective lens in a simple structure among three or more recording media. According to the optical pickup of the present invention, it is provided with the above-mentioned optical element of the present invention. Thus, it is possible to use three ore more recording media. The embodiment of the optical information recording/reproducing apparatus is provided with the above-mentioned optical pickup of the present invention. Thus, it is possible to use three ore more recording media.

These effects and other advantages of the present invention become more apparent from the following embodiment.

BRIEF DESCRIPTION OF DRAWINGS

FIG. 1 is a diagram showing a structural example of an optical pickup 100 in an embodiment of the present invention.

FIG. 2 is a schematic cross sectional view showing a recording medium 200 in the first embodiment of the present invention.

FIG. 3 is a cross sectional view showing an optical element 10 in the first embodiment of the present invention.

FIG. 4 is a plan view showing an incidence plane 12 of the optical element 10.

FIG. 5(a), FIG. 5(b) and FIG. 5(c) are diagrams illustrating the state of focusing of each laser light in the optical element 10.

FIG. 6 is a cross sectional view showing an optical element 30 in a modified example of the present invention.

FIG. 7 is a cross sectional view showing an objective lens 121 in the modified example of the present invention.

DESCRIPTION OF REFERENCE CODES

10 . . . optical element, 11 . . . base material, 12 . . . incidence plane, 13 . . . base material, 20 . . . hologram for spherical aberration correction, 21 . . . hologram, 22 . . . hologram, 100 . . . optical pickup, 200 . . . recording medium.

BEST MODE FOR CARRYING OUT THE INVENTION

Hereinafter, the best mode for carrying out the present invention will be explained in each embodiment in order, with reference to the drawings.

FIRST EMBODIMENT

<Structure and Operation of Optical Pickup>

Firstly, the structure and the operation of an optical pickup in an embodiment of the present invention, which includes an optical element in the embodiment of the present invention, will be explained with reference to FIG. 1. FIG. 1 is a diagram showing a structural example of an optical pickup 100.

In FIG. 1, the optical pickup 100 is an apparatus for recording and reading information with respect to three types of recording media, which are a BD, a DVD, and a CD.

The optical pickup 100 is provided with: a light source 101 for BD; a beam shaping lens 102; a dichroic mirror 103; a PBS (Polarized Beam Splitter) 104; a light source 105 for DVD; a coupling lens 106; a sensor lens 107 for BD/DVD; a detector 108 for BD/DVD; a collimator lens 109; a light source 110 for CD; a half mirror 111; a sensor lens 112 for CD; a detector 113 for CD; a coupling lens 114; a dichroic mirror 115; a ¼ wavelength plate 116; an optical element 10; and an objective lens 120. A luminous flux transmitted through the objective lens 120 focuses on the recording layer of a recording medium 200.

The light source 101 for BD is a light source for emitting laser light with a wavelength of 405 nm as being one example of the "first laser light" of the present invention. Moreover, the light source 105 for DVD is a light source for emitting laser light with a wavelength of 650 nm as being one example of the "second laser light" of the present invention. The light source 110 for CD is a light source for emitting laser light with a wavelength of 780 nm as being one example of the "third laser light" of the present invention. Incidentally, in the explanation described below, if not otherwise specified, the laser light with a wavelength of 405 nm emitted from the light source 101 for BD is referred to as the "first laser light", the laser light with a wavelength of 650 nm emitted from the light source 105 for DVD is referred to as the "second laser light", and the laser light with a wavelength of 780 nm emitted from the light source 110 for CD is referred to as the "third laser light".

The beam shaping lens 102 is a lens for shaping the first laser light to a circular cross-section and for supplying the first laser light after the shaping to the dichroic mirror 103. Moreover, the coupling lens 106 is a lens for supplying the second laser light, emitted from the light source 105 for DVD, to the dichroic mirror 103.

The dichroic mirror 103 is a mirror for reflecting the laser light with a particular wavelength, and here, it reflects the second light. Therefore, the first laser light and the second laser light which enter the dichroic mirror 103 go toward the same direction and enter the PBS 104.

The PBS 104 transmits the first laser light and the second laser light which enter from the light source 101 for BD and the light source 105 for DVD, respectively, and supplies them to the collimator lens 109. The collimator lens 109 is a lens for converting the incidence lights coming from the light sources to parallel light. The first laser light and the second laser light which are converted to the parallel light by the collimator lens enter the dichroic mirror 115.

Moreover, with respect to the reflected light coming from the recording medium 200, the PBS 104 converts its going direction to a direction toward the sensor lens 107 for BD/DVD. The sensor lens 107 for BD/DVD focuses the first laser light and the second laser light which enter from the PBS 104, on the detector 108 for BD/DVD. The detector 108 for BD/DVD detects the focused laser light. The detector 108 for BD/DVD is shared between the BD and the DVD.

On the other hand, the third laser light emitted from the light source 110 for CD enters the half mirror 111. The half mirror 111 is a half-plate mirror. As the PBS 104, the half mirror 111 transmits the laser light from the light source side, and reflects the laser light coming from the recording medium side in a direction toward the sensor lens 112 for CD. The sensor lens 112 for CD focuses the incident third laser light on the detector 113 for CD. The detector 113 for CD detects the focused laser light. The third laser light transmitted through the half mirror 111 enters the coupling lens 114. The coupling lens 114 is a lens for supplying the incidence third laser light to the dichroic mirror 115.

Incidentally, the third laser light is divergent light which enters the dichroic mirror 115 without through the collimator lens 109. Therefore, the optical pickup 100 is a finite system only for the CD.

The dichroic mirror 115 is a mirror for reflecting only the first laser light and the second laser light, and transmits the third laser light without influence. Therefore, in the end, the first laser light, the second laser light and the third laser light all go in the same direction. Each laser light is transmitted through the ¼ wavelength plate 116, and then enters the optical element 10. The detailed structure of the optical element 10 will be discussed later.

Each laser light transmitted through the optical element 10 enters the objective lens 120. The objective lens 120 is one example of the "objective lens" of the present invention, and is a lens for focusing the incidence light on the recording layer of the recording medium 200.

The optical pickup 100 has the above-mentioned structure. Incidentally, the optical pickup 100 is originally an optical system for the BD, and is one example of the "optical pickup" of the present invention in which the compatibility with the DVD and the CD can be realized by the operation of the optical element 10.

Now, the recording medium 200 is explained with reference to FIG. 2. FIG. 2 is a schematic cross sectional view of the recording medium 200.

The recording medium 200 includes: a recording medium 200a which is the BD; a recording medium 200b which is the DVD; and a recording medium 200c which is the CD. The recording medium 200 has recording layers 210a, 210b and 210c, which are one example of the "recording layer" of the present invention, in association with the recording media 200a, 200b and 200c, respectively. In the recording layers 210a, 210b and 210c, various information can be written and read by focusing thereon the first laser light, the second laser light and the third laser light, respectively.

Moreover, between each recording layer and the objective lens 120, there are transmission protection layers 220a, 220b and 220c, which are one example of the "transmission protection layer" of the present invention, in association with the recording media 200a, 200b and 200c, respectively. The thickness of the transmission protection layers 220a, 220b and 220c are 0.1 mm (i.e. one example of the "thickness D1" of the present invention), 0.6 mm (i.e. one example of the "thickness D2" of the present invention) and 1.2 mm (i.e. one example of the "thickness D3" of the present invention), respectively. Namely, the transmission protection layers 220a, 220b and 220 are generally referred to as a substrate. In the optical pickup 100, the recording media 200a, 200b and 200c are selected and used, as occasion demands.

<Structure of Optical Element 10>

Next, the structure of the optical element 10 will be explained with reference to FIG. 3. FIG. 3 is a cross sectional view showing the optical element 10.

In FIG. 3, the optical element 10 is provided with a base material 11, and a hologram 20 for spherical aberration correction is formed on an incidence plane 12 of the base material 11.

The base material 11 is an optically-transparent plate-like member, which is the base material of the optical element 10, and is made of glass or resin materials, such as plastics. The incidental plane 12 is a plane which faces to the ¼ wavelength plate 116 in the optical pickup 100.

The hologram 20 for spherical aberration correction is a hologram which is formed in one portion of the incidence plane 12 and which is one example of the "diffraction pattern" of the present invention. The hologram 20 for spherical aberration correction has such a shape that phase steps (or difference in level) are formed as a staircase pattern, as shown in the enlarged view in FIG. 3, and it is provided with a hologram 21 and a hologram 22. The hologram 21 is a hologram for correcting spherical aberration caused by a difference in substrate thickness between a substrate 220a and a substrate 220b and a difference in wavelength between the first laser light and the second laser light. The hologram 21 is one example of the "first aberration correcting device" of the present invention. Moreover, the hologram 22 is a hologram for correcting spherical aberration caused by the difference in substrate thickness between the substrate 220a and the substrate 220b, a difference in substrate thickness between the substrate 220a and the substrate 220c, the difference in wavelength between the first laser light and the second laser light and the difference in wavelength between the first laser light and the third laser light. The hologram 22 is one example of the "second aberration correcting device" of the present invention. The hologram 20 for spherical aberration correction is formed such that it has a moderate or shallow aspheric shape on the incidence plane 11.

Incidentally, the "phase steps" in the present invention are not limited to physical steps as in the embodiment, but they are a concept including everything which can cause some optical path length difference with respect to the transmitted laser light, as already described above.

<Structure of Hologram 20 for Spherical Aberration Correction>

Next, the details of the hologram 20 for spherical aberration correction will be explained with reference to FIG. 4. FIG. 4 is a plan view of the exit plane 12.

In FIG. 4, the hologram 20 for spherical aberration correction has areas A and area B concentrically formed around the optical axis of the incidence light. The optical axis is a central axis of the luminous flux and is the same for all the laser lights in the example.

The area A is a zonal area having an outer diameter r1 and an inner diameter r2 (r1>r2), in which the hologram 21 is formed. The area B is a zonal area having a diameter r2, in which the hologram 22 is formed.

The hologram 20 for spherical aberration correction is formed in order to share the objective lens 120 with respect to the second recording medium and the third recording medium. For this, forming area of the hologram 20 is greatly related to the effective diameter of the laser light corresponding to these recording media. The "effective diameter" of the present invention is defined on the basis of a concept which indicates the diameter of the luminous flux which contributes to the focusing by the objective lens, in each of the plurality of laser light. However, it is not necessarily defined on the objective lens. The effective diameter may be defined for the luminous flux which enters the optical element or which is emitted from the optical element. In other words, as long as the "effective diameter" is defined in an equal condition among the first laser light, the second laser light and the third laser light, the "effective diameter" is a concept broadly indicating the diameter of the luminous flux focused in a spot (focus) range in the end which is defined by the objective lens for each recording medium.

The "effective diameter" has a large effect on a NA (Numerical Aperture) determined for each recording medium. In the same focal distance, as the diameter of the luminous flux which enters the objective lens 120 increases, the NA increases. Moreover, as the NA increases, the spot diameter in which the laser light is focused decreases, and as the spot diameter decreases, the information can be recorded with higher density. The value of the NA is set in advance for each recording medium. Therefore, the effective diameter required for each recording medium is naturally determined. The value of the NA is defined as 0.85 in the BD, 0.6 in the DVD, and 0.45 in the CD. Therefore, the required effective diameter increases in order of the recording media 200a, 200b, and 200c.

Incidentally, the above-mentioned "NA" can be defined on either the material side (light source side) or the image point side (focal point side). The above-mentioned NA of each recording medium is the NA on the image point side.

Incidentally, the above-mentioned r1 is defined such that the second laser light can enter the objective lens 120 with the required effective diameter. In the same manner, the r2 is defined such that the third laser light can enter the objective lens 120 with the required effective diameter. Namely, the r1 in the embodiment is one example of the "outer diameter associated with the effective diameter R2" of the present invention, and the r2 in the embodiment is one example of the "inner diameter associated with the effective diameter R3" of the present invention or the "diameter associated with the effective diameter R3" of the present invention. Moreover, if the effective diameter is defined on the incidence plane 12 of the optical element 10, the r1 and the r2 may be the effective diameter itself.

In the hologram 20 for spherical aberration correction, each area is formed in this manner. Therefore, the outer side of the area B, i.e. the area A, is required to be an area where the third laser light (laser light for CD) is flared and diffused.

Here, since the optical pickup 100 is the optical system for the BD, if some spherical aberration correction is not performed, it is difficult to focus the light on each recording medium, due to large residual aberration. Therefore, the hologram 21 formed in the area A is a hologram which has a spherical aberration correction effect only on the second laser light. In the same manner, the hologram 22 formed in the area B is a hologram which has a spherical aberration correction effect on both the second laser light and the third laser light. In the embodiment, the effect which is different in each area is realized by changing the depth of the phase steps of each hologram.

In the hologram 20 for spherical aberration correction, as described above, the plurality of phase steps are formed as a staircase pattern, and the phase steps have a depth associated with the wavelength of each laser light. In the embodiment, the hologram 20 for spherical aberration correction is formed such that the hologram 20 for spherical aberration correction has the phase steps in which the optical path length difference of the first laser light (the laser light for BD) is to be an integral multiple of the wavelength. The optical path length difference is 2 wavelengths of the first laser light in the hologram 21, and 1 wavelength of the first laser light in the hologram 22. Moreover, each of the surfaces divided by the phase steps is a plane perpendicular to the optical axis. Therefore, if the first laser light is transmitted through the hologram 21 and the hologram 22, it behaves as if the laser light entered a plane perpendicular to the optical axis.

Here, the relationship such that the optical path length difference of 2 wavelengths of the first laser light corresponds to an optical path length difference of 1.2 wavelengths of the second laser light, and corresponds to an optical path length difference of 1 wavelength of the third laser light holds true. Of course, since the wavelength of the first laser light is 405 nm, the wavelength of the second laser light is 650 nm and the wavelength of the third laser light is 780 nm, strictly speaking, such a relationship does not hold true from wavelength ratio conversion. However, for example, in plastic and glass which can be the material of the optical element 10, as the wavelength becomes shorter, the refractive index increases. Thus, such a relationship substantially holds true in the material used in this application.

In other words, the "phase steps associated with each wavelength" described in the present invention is a concept not only which defines the phase steps having the optical path length difference which is strictly an integral multiple of the wavelength, but also which includes the phase steps having the optical path length difference which can practically behave as the integral multiple of the wavelength. Moreover, the aspect of the phase steps is not limited to the steps in the pattern described here. For example, the phase steps can be realized by refractive-index distribution. Furthermore, the aspect of the "association" is arbitrary as long as the effect of the present invention can be ensured.

If the optical path length difference generated in the phase steps which are formed in the hologram 20 for spherical aberration correction is an integral multiple of the wavelength and each of the surfaces divided by the phase steps is a plane perpendicular to the optical axis, the emitted laser light does not have a phase difference. For this, there is not any change on the wave front of the laser light; namely, there is not any wavefront correction. Therefore, with respect to the first laser light, an influence on the wave front does not appear in the area A and the area B, and the hologram 20 for spherical aberration correction behaves as if it was merely a parallel plate.

On the other hand, if the second laser light enters the hologram 20 for spherical aberration correction, the optical path length difference of 0.6 wavelength is generated in the hologram 21, and the optical path length difference of 0.5 wavelength is generated in the hologram 22. As described above, if the optical path length difference is not an integral multiple of the wavelength, a phase corresponding to the difference is added or appended to the wave front as the aberration.

The optical path length difference correlates with a diffraction order. For example, with regard to the first laser light transmitted through the hologram 21, since the optical path length difference of 2 wavelengths is generated on the phase steps, the diffraction efficiency of 2nd-order diffracted light is maximal and the calculated diffraction efficiency is 100%. Moreover, with regard to the first laser light transmitted through the hologram 22, since the optical path length difference of 1 wavelength is generated on the phase steps, the diffraction efficiency of 1st-order diffracted light is maximal and the calculated diffraction efficiency is 100%.

With regard to the second laser light transmitted through the hologram 21, since the optical path length difference of 1.2 wavelengths is generated on the phase steps, the 1st-order diffracted light with a diffraction efficiency of about 87.5% is generated, and a phase difference of +0.2 wavelength corresponding to a deviation from an integral multiple of the wavelength is appended to the wave front as the aberration, on each phase step. The hologram 21 is designed to correct the spherical aberration caused by the difference in substrate thickness between the substrates 220a and 220b and the difference in wavelength between the first laser light and the second laser light, by using the aberration caused by the phase steps, and designed to focus the second laser light on the recording layer 210b of the recording medium 200b.

In the same manner, with regard to the second laser light transmitted through the hologram 22, since the optical path length difference of 0.6 wavelength is generated on the phase steps, the 1st-order diffracted light with a diffraction efficiency of 57.3% is mainly generated in the area B, and a phase difference of −0.4 wavelength corresponding to a deviation from an integral multiple of the wave length is appended to the wave front as the aberration, on each phase step. The hologram 22 is designed to correct the spherical aberration caused by the difference in substrate thickness between the substrates 220a and 220b and the difference in wavelength between the first laser light and the second laser light, by using the aberration caused by the phase steps, and designed to focus the second laser light on the recording layer 210b of the recording medium 200b. On the basis of the diffraction of the second laser light caused by each hologram, the macroscopic shape of the hologram 20 for spherical aberration correction on the incidence plane 12, i.e. the above-mentioned moderate or shallow aspheric shape and the radius of the phase steps which constitute the hologram are determined. Therefore, the hologram 20 for spherical aberration correction is formed to correct the spherical aberration with respect to the second laser light.

On the other hand, if the third laser light enters the hologram 20 for spherical aberration correction, since the optical path length difference of just 1 wavelength of the third laser light is generated on the phase steps which constitute the hologram 21, any wavefront correction is not performed on the third laser light in the area A, and the spherical aberration is not corrected. Thus, the third laser light transmitted through this area does not contribute to the focusing on the recording layer 200c of the recording medium 200c. Namely, aperture limit to the third laser light is realized by the hologram 21.

In the hologram 22, since the optical path length difference of 0.5 wavelength is generated with respect to the third laser light, the 1st-order diffracted light with a diffraction efficiency of about 40.5% is generated, and a phase difference of −0.5 wavelength corresponding to a deviation from an integral multiple of the wave length is appended to the wave front as the aberration, on each phase step. Therefore, in the area B, the spherical aberration caused by the difference in substrate thickness between the substrates 220a and 220c and the difference in wavelength between the first laser light and the third laser light, are corrected by a predetermined amount, by using the aberration caused by the phase steps.

Here, the hologram 22 is designed to correct the spherical aberration caused by the difference in substrate thickness between the substrates 220a and 220b and the difference in wavelength between the first laser light and the second laser light, as described above. The difference in substrate thickness is "0.5 mm". Thus, if the aberration based on the difference in wavelength is temporarily disregarded in order to simplify the explanation, the aberration which can be corrected in the hologram 22 is the spherical aberration corresponding to the difference in substrate thickness of 0.5 mm. The difference in substrate thickness between the substrates 220a and 220c is "1.1 mm". Thus, the spherical aberration corresponding to about 0.6 mm cannot be corrected in the hologram 22. Namely, the spherical aberration caused by the difference in substrate thickness between the substrates 220a and 220c and the difference in wavelength between the first laser light and the third laser light, are corrected by the hologram 22 "by a certain amount". The uncorrected portion (the uncorrected aberration) is corrected by setting only the third laser light to diffused light, on the optical pickup 100. Thus, only the third laser light is used in the finite system.

By the way, generally, if the incidence light entering the objective lens is diverged light or converging light, the aberration is generated in the case where the lens is shifted from the optical axis due to a lens mounting error and tracking. In particular, if the large spherical aberration corresponding to the difference in substrate thickness of 1.1 mm is corrected in the finite system, it is necessary to set the divergence angle of the third laser light entering the lens, considerably acutely. This results in the large aberration generated in the case where the lens is shifted from the optical axis. For this, it is considered there is a need to inhibit the lens shift from the optical axis. However, in the embodiment, since a certain amount of spherical aberration is corrected by the hologram 22 with respect to the third laser light, it is possible to set the divergence angle of the third laser light entering the objective lens, to be milder than the case where the spherical aberration correction by the hologram is not performed. As a result, it is possible to inhibit the aberration generated due to the lens shift from the optical axis. Namely, the hologram 22 constructed to maximize the diffraction efficiency of the 1st-order diffracted light of the first laser light, has a certain amount of spherical aberration correction effect on the third laser light, and it is preferable because it can ease the influence of the lens shift from the optical axis if the third laser light is used in the finite system.

The expression of "correct" in the present invention not only has a meaning of complete correction, but also broadly defines such an operation that the spherical aberration is at least improved or reduced, as compared to the case where some methods for the spherical aberration correction re not taken.

<Operation of Optical Element 10>

The operation of the optical element 10 having the above-mentioned structure will be discussed with reference to FIGS. 5. FIGS. 5 are diagrams illustrating the state of focusing of the first, second and third laser lights. Incidentally, FIGS. 5 show a slightly different focus locus from the actual locus in order to explain the effect of the hologram 15 for chromatic aberration correction in an easily understood manner.

FIG. 5(a) shows the state of focusing of the first laser light. With respect to the first laser light, it is not subject to any aperture limit nor any wavefront correction, in the hologram 20 for spherical aberration correction. Thus, the entire luminous flux which enters the objective lens 120 focuses on the recording layer 210a of the recording medium 200a.

FIG. 5(b) shows the state of focusing of the second laser light. With respect to the second laser light, since the luminous flux transmitted through an unformed area where the hologram 20 for spherical aberration correction is not formed is diffused by the spherical aberration caused by the difference in substrate thickness between the substrates 220a and 220b and the difference in wavelength between the first laser light and the second laser light, it does not contribute to the focusing. However, since the luminous flux transmitted through the hologram 20 for spherical aberration correction receives the above-mentioned spherical aberration correction effect by the hologram 21 and the hologram 22, it focuses on the recording layer 210b of the recording medium 200b.

FIG. 5(c) shows the state of focusing of the third laser light. With respect to the third laser light, since the luminous flux transmitted through an, unformed area where the hologram 20 for spherical aberration correction is not formed is diffused because the spherical aberration caused by the difference in substrate thickness between the substrates 220a and 220c and the difference in wavelength between the first laser light and the third laser light cannot be completely corrected by the aberration correction effect in the finite system, it does not contribute to the focusing. Moreover, out of the luminous flux transmitted through the hologram 20 for spherical aberration correction, since the luminous flux transmitted through the hologram 21 is diffused because it does not receive the above-mentioned wavefront correction effect, it does not contribute to the focusing. Therefore, in the end, only the luminous flux transmitted through the hologram 22 focuses on the recording layer 210c of the recording medium 200c.

As explained above, owing to the optical element 10 in the embodiment, the objective lens 120 can be shared with respect to the three types of recording media for reading and writing the information by using the three types of laser lights with different wavelengths. Therefore, even in the optical pickup 100 equipped with the optical element 10, the objective lens 120 can be shared. Moreover, this effect is ensured even in an optical information recording/reproducing apparatus provided with the optical pickup 100. As one example of the optical information recording/reproducing apparatus, there is listed a composite drive unit which can perform the reproduction of the BD, the DVD, and the CD or the like.

Incidentally, the above-mentioned hologram 21 in the first embodiment is constructed to maximize the diffraction efficiency of the 2nd-order diffracted light with respect to the first laser light. However, even if it is constructed to maximize the diffraction efficiency of other even-order diffracted light, it is possible to obtain the same effect. Namely, since the phase steps, which generate the optical path length difference of 1 wavelength with respect to the first laser light, generate the optical path length difference of 0.5 wavelength with respect to the third laser light, the phase steps, which generate the optical path length difference of even number wavelengths with the first laser light, generate the optical path length difference which is an integral multiple of the wavelength even with respect to the third laser light. By this, it is possible to design the hologram 21 such that there is no wavefront correction effect for both the first and third laser light.

In this case, however, if the phase steps are constructed to maximize the diffraction efficiency of (a multiple of 10)-order diffracted light with respect to the first laser light, the wavefront correction effect is lost even on the second laser light. This is because the optical path length difference of 6 wavelengths, which is an integral multiple of the wavelength, is generated even with respect to the second laser light, on the phase steps which generate the optical path length difference of 10 wavelengths with the first laser light. Thus, the hologram 21 may be constructed to maximize the diffraction efficiency of even-order (other than the multiple of 10) diffracted light with respect to the first laser light.

Incidentally, the phase steps which constitute the hologram are preferably shallow in order to facilitate metal-mold preparation and to separate the hologram from mold at the time of hologram molding. Moreover, in the hologram, as the diffraction order to maximize the diffraction efficiency increases, the phase steps to realize that needs to be deeper. In view of such circumstances, as in the above-mentioned first embodiment, it is preferable, in terms of mass production, to construct the hologram 21 to maximize the diffraction efficiency of the 2nd-order diffracted light with respect to the first laser light.

Moreover, the above-mentioned hologram 22 in the first embodiment is constructed to maximize the diffraction efficiency of the 1st-order diffracted light with respect to the first laser light. However, it may be constructed to maximize the diffraction efficiency of other odd-order diffracted light.

In this case, however, if the phase steps are constructed to maximize the diffraction efficiency of (a multiple of 5)-order diffracted light of the first laser light, the wavefront correction effect is lost even on the second laser light. This is because the optical path length difference of 3 wavelengths, which is an integral multiple of the wavelength, is generated even with respect to the second laser light, on the phase steps which generate the optical path length difference of 5 wavelengths with the first laser light. Thus, the hologram 22 may be constructed to maximize the diffraction efficiency of odd-order (other than the multiple of 5) diffracted light with respect to the first laser light.

Incidentally, in the above-mentioned hologram 22 in the first embodiment, which is constructed to maximize the diffraction efficiency of the 1st-order diffracted light with respect to the first laser light, since the phase steps are shallower than the case where it is designed to maximize the diffraction order of high-order diffracted light, it is preferable, in terms of mass production, for the same reasons as already described.

Moreover, the above-mentioned hologram 21 and hologram 22 in the first embodiment are formed from phase steps which generate the optical path length difference which is just an integral multiple of the wavelength with respect to the first laser light. This corresponds to a hologram blazed to set the diffraction efficiency of the first laser light to 100%, and it is merely one example of designing the optical element of the present invention. In the hologram, if there is no change in refractive index of the base material 11, the macroscopic shape and the radius of each of the phase steps which constitute the hologram, there is no change in the aberration correction effect with respect to predetermined-order diffracted light with a predetermined wavelength. If only the amount of phase steps is changed, the diffraction efficiency is only changed. Therefore, even in the hologram 21 and the hologram 22, by changing the amount of phase steps without changing the refractive index of the base material 11, the macroscopic shape and the radius of each of the phase steps, it is possible to improve the diffraction efficiencies of the second laser light and the third laser light, at the cost of the diffraction efficiency of the first laser light. For example, in the above-mentioned hologram 22 in the first embodiment which is blazed to generate the optical path length difference of 1 wavelength on the phase steps with respect to the first laser light, the calculated diffraction efficiency of the 1st-order diffracted light of the first laser light is 100%; however, that of the second laser light is about 57.3%, and that of the third laser light is about 40.5%. As opposed to this, if the hologram 22 is blazed to generate the optical path length difference of 1.2 wavelengths on the phase steps with respect to the first laser light, the calculated diffraction efficiency of the 1st-order diffracted light of the first laser light is reduced to about 87.5%; however, that of the second laser light improves to about 76.7%, and that of the third laser light improves to about 57.3%. As described above, the phase steps which constitute the hologram 21 and the hologram 22 are not limited to such phase steps that the optical path length difference generated with respect to the first laser light is an integral multiple of the wavelength. The phase steps can be changed in view of balance in the diffraction efficiency of different-diffraction-order diffracted light, as occasion demands.

Moreover, the structure of the hologram 20 for spherical aberration correction is not limited to the above-mentioned aspect, and it is arbitrary as long as it can be formed on the optical element 10 and the above-mentioned wavefront correction effect and the above-mentioned aperture limit can be realized. For example, the hologram 20 for spherical aberration correction may be divided into more areas than in the embodiment, and each of the areas may be provided with different phase steps. Moreover, even in the aspect in which the hologram is divided into two areas as in the embodiment, the diffraction order to maximize the diffraction efficiency may be different in each area from the embodiment.

Moreover, in an unformed area on the incidence surface 12 where the hologram 20 for spherical aberration correction is not formed, nothing may be formed, or another hologram may be formed. For example, the phase steps which generate the optical path length difference of 10 wavelengths of the first laser light, may be formed in this unformed area, as the hologram, in order to maximize 10th-order diffracted light of the first laser light. The optical path length difference generated in the case where such phase steps are formed, is 6 wavelengths with respect to the second laser light, and 5 wavelengths with respect to the third laser light. If each of the surfaces divided by the phase steps is a plane perpendicular to the optical axis, there is not any wavefront correction effect on arbitrary laser light. Therefore, the second laser light and the third laser light are not focused on the recording layers of the second recording medium and the third recording medium, respectively. As described above, if some hologram is formed in the area other than where the hologram 20 for spherical aberration correction is formed, it is preferably to form the hologram not to cause the wavefront correction with respect to the fist laser light transmitted through the area, and not to focus the second laser light and the third laser light on the target recording layer due to unnecessary diffraction.

Incidentally, by adopting the concept disclosed in the embodiment, it is also possible to easily realize the sharing of the objective lens in more number of recording media.

MODIFIED EXAMPLE

<Modified Example of Optical Element>

In the optical element 10, the hologram 20 for spherical aberration correction is divided into the two areas. Each of the areas has different phase steps, and on its boundary surface, in some cases, aberration generated when there is a small change in wavelength of the laser light (referred to as chromatic aberration) becomes discontinuous. In this case, since it is difficult to make correction with a normal spherical lens, some chromatic aberration correcting device is required. This type of modified example of the present invention will be explained with reference to FIG. 6. FIG. 6 is a cross sectional view showing an optical element 30 in the modified example of the present invention. Incidentally, in FIG. 6, the points overlapping those of FIG. 3 carry the same numerical references, and the explanation thereof will be omitted.

In FIG. 6, the optical element 30 has a hologram 31 for chromatic aberration correction, on the opposite plane of the incidence plane 12, i.e. on an, exit plane 13 which faces or is opposed to the objective lens 120. The hologram 31 for chromatic aberration correction is a zonal hologram, as in the hologram 20 for spherical aberration correction, and phase steps capable of correcting at least one portion of the above-mentioned chromatic aberration are formed in a staircase pattern. As described above, by forming the hologram for chromatic aberration correction on the exit plane which is not used in the optical element 10, it is possible to efficiently correct the chromatic aberration. Such a hologram for chromatic aberration correction may be a different member from the hologram 20; however, the discontinuous chromatic aberration remains if the hologram 20 is shifted from the optical axis, due to a lens mounting error and tracking. Thus, as shown in FIG. 6, the hologram for chromatic aberration correction is preferably unified with the hologram 20.

Moreover, both the hologram 31 for chromatic aberration correction and the hologram 20 for spherical aberration correction can be also formed on the incidence plane 12 or the exit plane 13.

Moreover, if the interval of individual phase steps is an extremely narrow pitch in the case where both hologram 20 and 31 is formed on the incidence plane 12 or the exit plane 13, the relevant phase steps are averaged, and formed as phase steps combined in advance.

<Modified Example of Objective Lens>

The hologram for spherical aberration correction in the embodiment may be directly formed on the objective lens 120 in advance. Such an objective lens 120 will be explained with reference to FIG. 7. FIG. 7 is a cross sectional view showing the objective lens 121 in the modified example of the present invention. Incidentally, in FIG. 7, the points overlapping those of FIG. 3 carry the same numerical references, and the explanation thereof will be omitted.

In FIG. 7, in the objective lens 121, the hologram 20 for spherical aberration correction is formed on a lens surface 122 on the recording medium side. On the lens surface 122, a portion where the hologram is formed is in a staircase pattern due to the phase steps. As described above, by forming the objective lens 121 and the hologram 20 for spherical aberration correction as one body, the number of parts can be greatly reduced, and it is effective. Moreover, as in the modified example of the optical element 10 described above, the hologram for chromatic aberration correction can be also unified with the objective lens. Moreover, the objective lens with the hologram formed in this manner, is also within a scope of the "optical element" of the present invention.

Incidentally, the present invention is not limited to the above-described example, and various changes may be made, if desired, without departing from the essence or spirit of the invention which can be read from the claims and the entire specification. An optical element, an optical pickup, and an optical information recording/reproducing apparatus, all of which involve such changes, are also intended to be within the technical scope of the present invention.

INDUSTRIAL APPLICABILITY

The optical element, the optical pickup, and the optical information recording/reproducing apparatus according to the present invention can be applied to an optical element, an optical pickup, and an optical information recording/reproducing apparatus, in which an objective lens can be shared with respect to three or more types of recording media on which writing and reading are performed by using laser light, for example.

The invention claimed is:

1. An optical element disposed on an optical path of first laser light and a plurality of laser lights, in order to share an objective lens for focusing light on a first recording medium, which comprises a recording layer which receives the first laser light through a transmission protection layer with a thickness of D1, in the plurality of laser lights whose wavelengths are different from that of the first laser light and in a plurality of recording media corresponding to the respective plurality of laser lights, the plurality of laser lights including second laser light which corresponds to a second recording medium having a transmission protection layer with a thickness of D2 (D2>D1), and third laser light which corresponds to a third recording medium having a transmission protection layer with a thickness of D3 (D3>D2) and is used in a finite system, an effective diameter of a luminous flux required when the first laser light enters the objective lens being R1, an effective diameter of a luminous flux required when the second laser light enters the objective lens being R2 (R1>R2), an effective diameter of a luminous flux required when the third laser light enters the objective lens being R3 (R2>R3), said optical element comprising:

a first aberration correcting device for correcting aberration caused by a difference between the thickness D1 of the transmission protection layer and the thickness D2 of the transmission protection layer and a difference in wavelength between the first laser light and the second laser light, said first aberration correcting device being disposed in an area corresponding to the effective diameter R2 of an incidence plane or an emit plane of said optical element; and a second aberration correcting device for correcting aberration caused by the difference between the thickness D1 of the transmission protection layer and the thickness D2 of the transmission protection layer, a difference between the thickness D1 of the transmission protection layer and the thickness D3 of the transmission protection layer, the difference in wavelength between the first laser light and the second laser light and a difference in wavelength between the first laser light and the third laser light, said second aberration correcting device being disposed in an area corresponding to the effective diameter R3 of the incidence plane or the emit plane.

2. The optical element according to claim 1, wherein said first aberration correcting device and said second aberration correcting device are formed in different areas of the incidence plane or the emit plane, and formed in a concentric and zonal pattern.

3. The optical element according to claim 1, wherein
said first aberration correcting device is formed in a zonal pattern with an outer diameter associated with the R2 and an inner diameter associated with the R3, on the incidence plane or the emit plane, and
said second aberration correcting device is formed in a circular pattern with a diameter associated with the R3, on the incidence plane or the emit plane.

4. The optical element according to claim 1, wherein wavelength range of the first laser light is 400 to 410 nm, wavelength range of the second laser light is 635 to 670 nm and wavelength ranges of the third laser light is 780 to 810 nm.

5. The optical element according to claim 1, wherein each of said first and second aberration correcting devices is a diffraction pattern in which a plurality of phase steps are formed in association with wavelength of each of the first laser light, the second laser light and the third laser light.

6. The optical element according to claim 5, wherein said first aberration correcting device is formed to maximize diffraction efficiency of even-order (except for a multiple of 10) diffracted light of the first laser light, and said second aberration correcting device is formed to maximize diffraction efficiency of odd-order (except for a multiple of 5) diffracted light of the first laser light.

7. The optical element according to claim 6, wherein the even-order diffracted light is second-order diffracted light.

8. The optical element according to claim 6, wherein the odd-order diffracted light is first-order diffracted light.

9. The optical element according to claim 1, wherein said optical element is disposed with the objective lens as one body.

10. An optical pickup comprising the optical element according to claim 1.

11. An optical information recording/reproducing apparatus comprising the optical pickup according to claim 10.

* * * * *